US006785355B2

(12) United States Patent
Georgii

(10) Patent No.: US 6,785,355 B2
(45) Date of Patent: Aug. 31, 2004

(54) METHOD AND SYSTEM FOR MANUFACTURING STORAGE CONTAINER FOR STORING NUCLEAR FUEL

(75) Inventor: Hans Georgii, London (GB)

(73) Assignee: Oyster International N.V., Curacao (AN)

( * ) Notice: Subject to any disclaimer, the term of this patent is extended or adjusted under 35 U.S.C. 154(b) by 0 days.

(21) Appl. No.: 10/257,141

(22) PCT Filed: Apr. 11, 2001

(86) PCT No.: PCT/SE01/00811

§ 371 (c)(1),
(2), (4) Date: Oct. 9, 2002

(87) PCT Pub. No.: WO01/78084

PCT Pub. Date: Oct. 18, 2001

(65) Prior Publication Data

US 2003/0167735 A1 Sep. 11, 2003

(30) Foreign Application Priority Data

Apr. 11, 2000 (SE) .............................. 0001328

(51) Int. Cl.⁷ ............................................. G21C 19/06
(52) U.S. Cl. ...................... 376/272; 376/261; 220/645; 220/646; 220/653; 220/654; 264/228; 264/229; 264/231; 264/232; 264/239; 250/506.1; 250/507.1; 250/515; 250/518; 250/522; 250/526; 588/3; 588/16
(58) Field of Search .............................. 376/261, 272; 220/645, 646, 653, 654; 264/228, 229, 231, 232, 239; 250/506.1, 507.1, 515, 518, 522, 526; 588/3, 16

(56) References Cited

U.S. PATENT DOCUMENTS

| 3,249,664 | A | | 5/1966 | Georgii | ....................... 264/88 |
|---|---|---|---|---|---|
| 3,589,088 | A | * | 6/1971 | Seidl | .......................... 52/223.2 |
| 3,630,161 | A | * | 12/1971 | Georgii | ....................... 114/256 |
| 3,686,886 | A | * | 8/1972 | Georgii | ....................... 405/205 |
| 3,825,220 | A | * | 7/1974 | Schmaltz | ..................... 249/194 |
| 3,913,335 | A | * | 10/1975 | Helen | .......................... 405/210 |
| 3,967,675 | A | * | 7/1976 | Georgii | ....................... 165/45 |
| 4,011,728 | A | * | 3/1977 | Turzillo | ...................... 405/222 |
| 4,257,912 | A | * | 3/1981 | Fleischer et al. | ............... 588/4 |
| 4,366,095 | A | * | 12/1982 | Takats et al. | ................. 588/16 |
| 4,377,509 | A | * | 3/1983 | Haynes et al. | ................ 588/16 |

(List continued on next page.)

FOREIGN PATENT DOCUMENTS

| DE | 3515871 | * | 6/1986 |
|---|---|---|---|
| DE | 35 15 871 | | 11/1986 |
| KR | 2001096389 | * | 4/2000 |
| WO | WO 80/02708 | * | 12/1980 |
| WO | WO 96/21932 | | 1/1996 |

Primary Examiner—Michael J. Carone
Assistant Examiner—John Richardson
(74) Attorney, Agent, or Firm—Stites & Harbison PLLC; Douglas E. Jackson

(57) ABSTRACT

A method for storing nuclear fuel in a container (10) including a concrete body and a fuel receiver embedded in the concrete body, comprises the steps of: providing formwork (62) for the concrete body and supporting the fuel receiver within the formwork; placing the formwork in an immersed position in a pool (54) containing a body of water; placing concrete in the immersed formwork (62); and removing the formwork with the concrete body cast therein from the pool (52). A system for manufacturing a storage container (10) for use in the method comprises: a water pool (52) of a depth at least equal to the height of the storage container (10) to be manufactured; facilities for assembling concrete formwork (62) for the concrete body (12) of the storage container (10); facilities for moving the formwork and the fuel receiver to the water pool (52); facilities for placing concrete in the formwork (62) with the formwork immersed in water in the water pool (52); and facilities for removing the formwork (62) and the concrete body (12) therein from the water pool (52).

15 Claims, 6 Drawing Sheets

U.S. PATENT DOCUMENTS

| | | | | |
|---|---|---|---|---|
| 4,634,875 A | * | 1/1987 | Kugeler et al. | 250/506.1 |
| 5,024,557 A | * | 6/1991 | Iorns | 405/223 |
| 5,125,532 A | * | 6/1992 | Casagrande | 220/62.15 |
| 5,327,469 A | * | 7/1994 | Georgii | 376/272 |
| 5,545,796 A | * | 8/1996 | Roy et al. | 588/4 |
| 5,599,139 A | * | 2/1997 | Chewning et al. | 405/129.6 |
| 5,646,971 A | * | 7/1997 | Howe | 376/272 |
| 5,950,557 A | * | 9/1999 | Georgii | 114/257 |
| 6,008,428 A | * | 12/1999 | Georgii | 588/16 |
| 6,438,190 B2 | * | 8/2002 | Gluschke et al. | 376/260 |

* cited by examiner

METHOD AND SYSTEM FOR MANUFACTURING STORAGE CONTAINER FOR STORING NUCLEAR FUEL

This invention relates to a method for storing nuclear fuel, especially spent nuclear fuel that has been extracted from a nuclear reactor and is to be stored for a shorter or longer time, e.g. while waiting for reprocessing, destruction or transport to an ultimate storage. Moreover, the invention relates to a system for carrying the method into effect.

It is known to contain spent nuclear fuel in large storage containers of concrete; such containers may be in the shape of parallelepiped shaped or, more common, circular cylindrical reinforced upstanding concrete bodies having a height of about 6 m and a diameter of 2.5 to 3 m, for example. Examples of embodiments of such storage containers are shown in DE-35 15 871-A1 and WO96/21932. The fuel to be stored in the storage container is placed in a fuel vessel or receiver, made of steel or other suitable material, which is embedded in the concrete body.

When spent fuel is extracted from a nuclear reactor it is usually placed in a water pool near the reactor, often within the nuclear power station, where it is kept until it is transported to a reprocessing plant or to a storage site, such a an ultimate storage.

Primarily, the present invention is concerned with the step of the storage process which includes containment of the spent nuclear fuel in a storage container. In the context of the invention that step also may include transfer of the spent fuel from the reactor site or an intermediate-storage pool to the site of where the containment is effected, and also the method for the disposition of the storage container in a storage site following the containment operation.

In accordance with the invention there is provided a method for storing nuclear fuel in a storage container including a concrete body and a fuel receiver embedded in the concrete body, which method comprises the steps of: introducing the nuclear fuel into the fuel receiver; providing formwork for the concrete body and mounting the fuel receiver within the formwork; placing the formwork in an immersed position in a pool containing a body of water; placing concrete in the immersed formwork to form the concrete body; and removing the formwork with the concrete body formed therein from the pool.

These steps need not necessarily be carried out in the order in which they are mentioned.

In the method according to the invention, the containment of the nuclear fuel in the storage container is integrated in the making of the storage container. The making of the major part if the storage container, i.e. the concrete body, and thus the embedding of the fuel receiver in the concrete thus is performed in its entirety under water and preferably in a manner such that the fuel receiver will be jointlessly embedded in the concrete.

The invention offers a possibility of a rational and secure implementation of the entire process, including the transfer of the nuclear fuel to and into the fuel receiver. Throughout this process the fuel can be immersed in water at a safe depth.

In accordance with the invention there is also provided a system for implementation of the process, namely a system for manufacturing a storage container for nuclear fuel, especially spent nuclear fuel, and containment of the fuel in a fuel receiver in a concrete body forming part of the storage container, said system comprising: a water pool of a depth at least equal to the height of the storage container to be manufactured; facilities for assembling concrete formwork for the concrete body of the storage container; facilities for moving the formwork and the fuel receiver to the water pool; facilities for introducing the nuclear fuel in the fuel receiver; facilities for placing concrete in the formwork with the formwork immersed in water in the water pool to form the concrete body in the formwork; and facilities for removing the formwork and the concrete body formed therein from the water pool.

Preferably, the pool has at least two pool sections which can be interconnected, suitably through a water lock, namely a pool section in which the fuel is introduced into the fuel receiver and another pool section in which the placement of the concrete in the formwork is effected. The depth of the first pool section suitably is at least equal to the sum of the height of the storage container and the height of fuel units, such as fuel assemblies or fuel rod units, which hold the fuel and are introduced from above into the fuel receiver. This depth permits keeping the fuel units constantly immersed. Preferably, the depth is such that the fuel units need never come closer to the water surface than 2 to 3 m. After the fuel units have been introduced into the fuel receiver and the fuel receiver has been sealed, the formwork is moved to the other pool section where the placing of the concrete is carried out. This pool section may have a lesser depth than the first pool section, but the depth should be at least equal to the height of the storage container so that the entire storage container can be constantly immersed.

Preferably, an further pool section is provided which communicates with the first pool section, suitably through a water lock. In this further pool section the fuel units may be placed while waiting for their introduction into the fuel receiver. This further pool section should also be of such a depth that the fuel units may be constantly immersed in the water and preferably have their top parts at least 2 to 3 m below the water surface.

The invention will be described in greater detail below with reference to the accompanying diagrammatic drawings, which show embodiments of the invention, given by way of example only.

Figure 1:
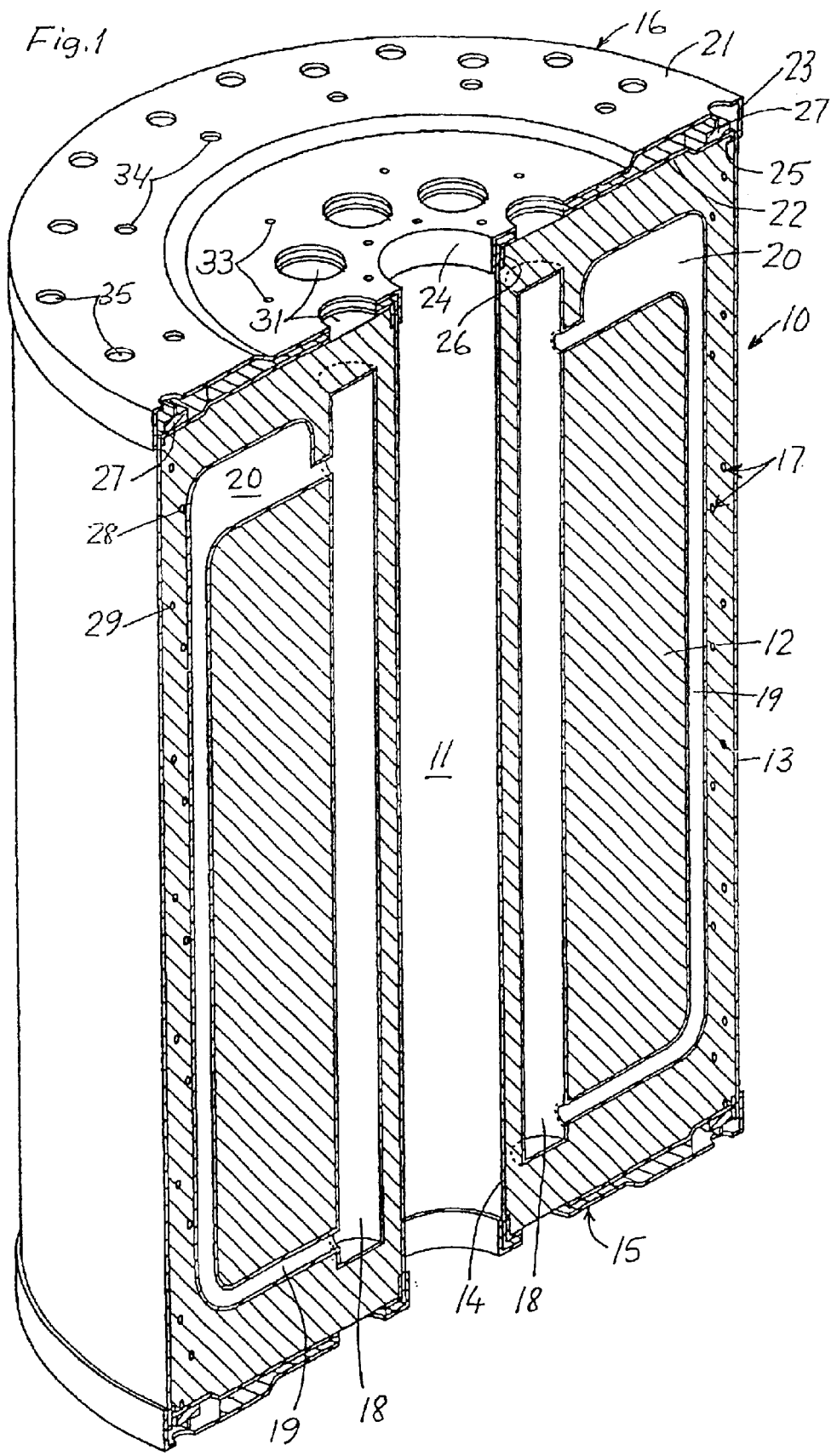
FIG. 1 is a sectional perspective view in axial diametral section of a storage device having a fuel receiver comprising eight storage compartments, each adapted to accommodate a nuclear fuel unit.

The storage device shown in FIG. 1, hereinafter also referred to as a cask and designated by 10, is only an example of the type of storage container which is useful for storing nuclear fuel in accordance with the invention, namely a storage container that includes a concrete body and at least one fuel receptacle or receiver embedded in the concrete body and serving to hold the nuclear fuel during storage. The nuclear fuel to be stored may take various forms, but the embodiment of the storage container or cask 10 shown in FIG. 1 is especially useful for the storage of fuel in the form of fuel assemblies or bundles of fuel rods. This also is true of the cask shown in FIG. 3.

Broadly, the cask 10 is in the shape of a straight cylindrical body having an axial through cylindrical central passage 11 of circular cross-section. The main part of the space accommodated by the cylinder is occupied by a concrete body 12, which is of the same general shape as the entire cask.

The cylindrical outer surface of the concrete body 12 is covered by a cylindrical shell 13, and its central passage is lined with a cylindrical centre tube 14 forming the major part of the central passage 11. The shell 13 and the centre tube 14 are permanent parts of the formwork in which the concrete body 12 is cast, i.e. they remain parts of the cask 10 in use.

The ends of the concrete body 12 are covered by a circular lower end cover 15 and a similar upper end cover 16. As will be seen from the following detailed description, the end covers 15 and 16 are made of sheet steel and like the shell 13 and the centre tube 14 they are permanent formwork parts.

Embedded in the concrete body 12 is a pre-stressed reinforcement, generally designated by 17, which is anchored in the end covers 15 and 16 and pre-stresses the concrete body three-dimensionally, that is axially and in all radial directions. The reinforcement 17 is positioned adjacent the cylindrical outer surface of the concrete body 12.

A fuel receiver including a number of closed circular cylindrical receiver sections or storage vessels, generally designated by 18 is embedded in the concrete body 12 such that there are no joints in the concrete contacting the storage vessels. The storage vessels are hermetically sealed and form distributed storage compartments (fuel compartments) for holding the stored fuel units. In the illustrated embodiment, the storage vessels 18 are eight in number and positioned with their axes on an imaginary cylindrical surface which is concentric with the concrete body 12 and the central passage 11.

Figure 3:
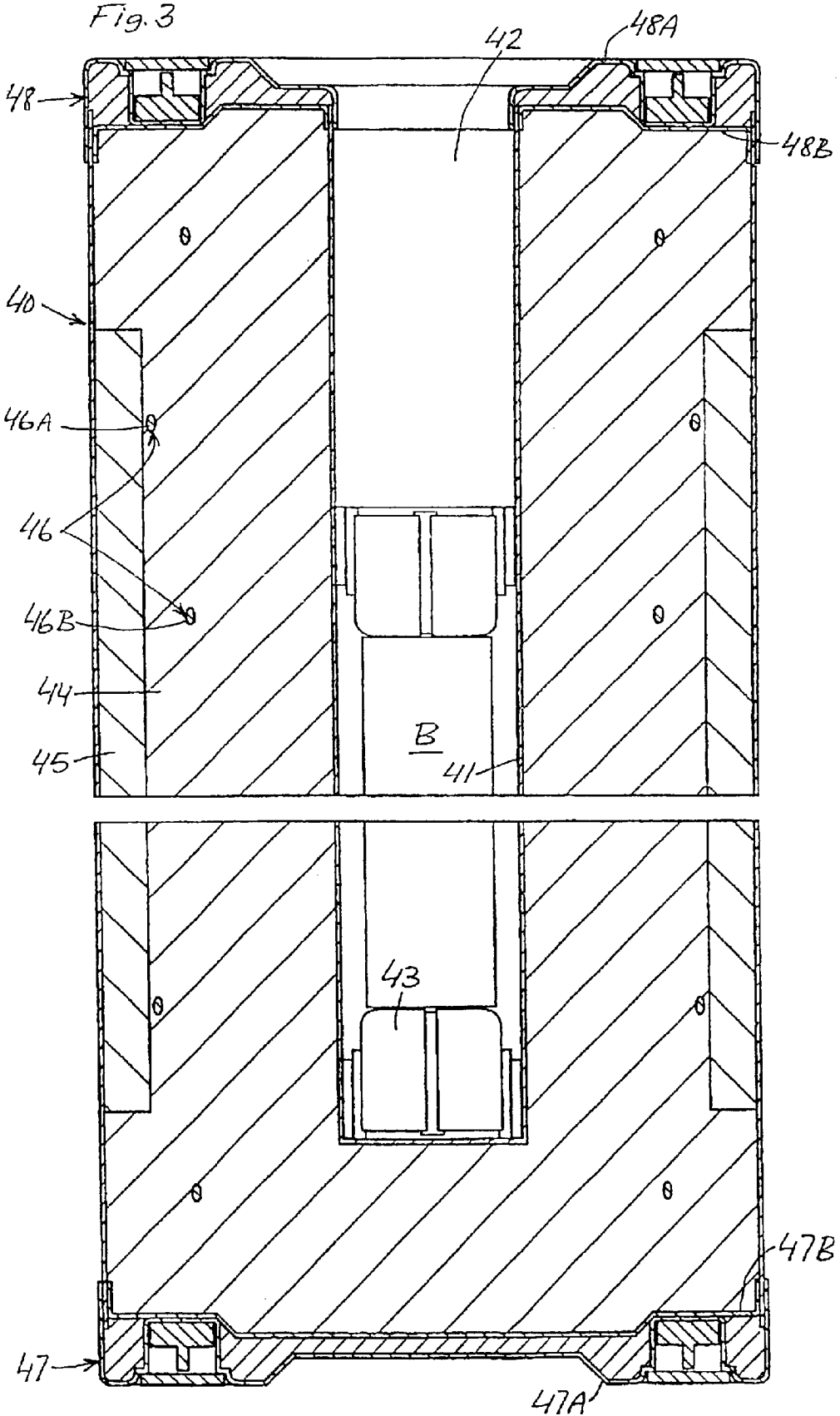
FIG. 3 is a view in axial section of a modified embodiment of storage device which can be manufactured in accordance with the invention, this storage container being primarily intended for interim, short-term storage, such a storage of the nuclear fuel during shipping.

As is apparent from the figures, see especially FIGS. 1 and 3, the distance separating the storage vessels 18 from the centre tube 14 is much smaller than the distance separating the storage vessels 18 and the shell 13. The storage compartments formed by the storage vessels 18 are filled with a fluid coolant, such as water.

In each storage vessel 18 the coolant circulates through natural convection (thermosiphon circulation) in a closed coolant circuit including a tube 19, the ends of which communicate with the interior of the storage vessel 18 at the upper and lower ends of the vessel and which is positioned mainly in the radially outer part of the concrete body 12. Thus, the coolant carries part of the heat produced in the storage vessel 18 outwardly to that part of the concrete body, and from that part the heat can dissipate into the ambient air or water. Additional heat is carried away inwardly into the central passage 11 from which it can be dissipated convectively into the ambient medium by air or water flowing upwardly through the passage.

That part of the coolant circuit which is located outside the storage vessel 18 also includes an expansion vessel 20 adjacent the upper end of the storage vessel.

The end covers 15 and 16 are substantially identical, and in the following description they are primarily represented by the upper end cover 16. Both end covers 15, 16 serve as end walls of the permanent formwork in which the concrete body 12 is cast, as anchoring members for the reinforcement 17 of the concrete body, and as protective members of the ends of the concrete body in the completed cask 10. Additionally, the upper end cover 16 can serve as a work platform during stressing of the reinforcement and any future removal of the contents of the storage vessels 18. Such removal includes working off the concrete directly above the storage vessels 18, so that the upper ends of the storage vessels can be reopened.

As is apparent from the drawing figures, the end cover 16 consists mainly of an upper or outer plate 21 and a lower or inner plate 22. In the finished cask 10 the plates 21, 22 are joined together in a suitable manner, e.g. by welding, and the space between them is partly or completely filled with concrete. Advantageously, the space between the plates may also accommodate equipment which is accessible from the exterior of the cask 10 and used e.g. for monitoring and signalling purposes, such as equipment for temperature and activity measurements, leakage detection and communication with monitoring stations.

Both plates 21, 22 are circular and have a central opening of approximately the same diameter as the centre tube 14. At their inner edge and their outer edge the plates are provided with downwardly directed circular cylindrical rims 23 and 24 on the outer plate 21, and 25 and 26 on the inner plate 22. The rims 23 and 24 on the outer plate 21 extend over the rims 25 and 26 on the inner plate 22. The upper end of the shell 13 extends into the gap between the outer rims 23 and 25, and in a corresponding manner the upper end of the centre tube 14 extends into the gap between the inner rims 24 and 26.

On the radially outer part of the inner plate 24 an annular steel rail 27 is supported which serves as an anchoring member for two groups of circumferentially uniformly spaced anchoring members (rods, cables or wires) 28, 29 of the reinforcement 17, and as a means for introducing the pre-stressing forces into the concrete body 12. Additionally, the rail 27 serves as an anchoring member for a plurality of circumferentially spaced devices (not shown) for attaching lifting devices used for lifting the entire cask 10.

The central portion of the outer plate 21 is depressed and provided with a number of openings 31, one such opening being directly above each storage vessel 18. In the inner plate 22 a corresponding opening 32 is provided. These openings are sized such that the fuel units can readily be introduced into the open upper ends of the storage vessels 18 before the concrete body 12 is formed by placement of the concrete. Preferably, the diameter of the openings 31, 32 is at least as large as the diameter of the storage vessels 18.

Adjacent the openings 32 the upper plate 21 also is provided with auxiliary means, symbolically represented by dots 33, for the positioning and attachment of suitable tools for working off the concrete beneath the openings when the contents of the storage vessels 18 are to be made accessible a shorter or longer storage time after the cask 10 has been completed, such as when the stored fuel units are to be extracted to be subjected to inspection or reprocessing or other treatment.

In the upper end cover 16 a ring of openings 34 are formed for the passage of concrete placing tubes (not shown) through which concrete is introduced into the space defined between the shell 13, the centre tube 14 and the end covers 15, 16. Moreover, there is a ring of openings 35 through which anchoring devices for the reinforcing members 27, 28 are accessible for manipulation.

The lower end cover 15 may be substantially identical with the upper end cover 16 but may also be modified at least such that it does not have openings corresponding to the openings 31, 32 and 34 of the upper end cover 16.

Figure 2:
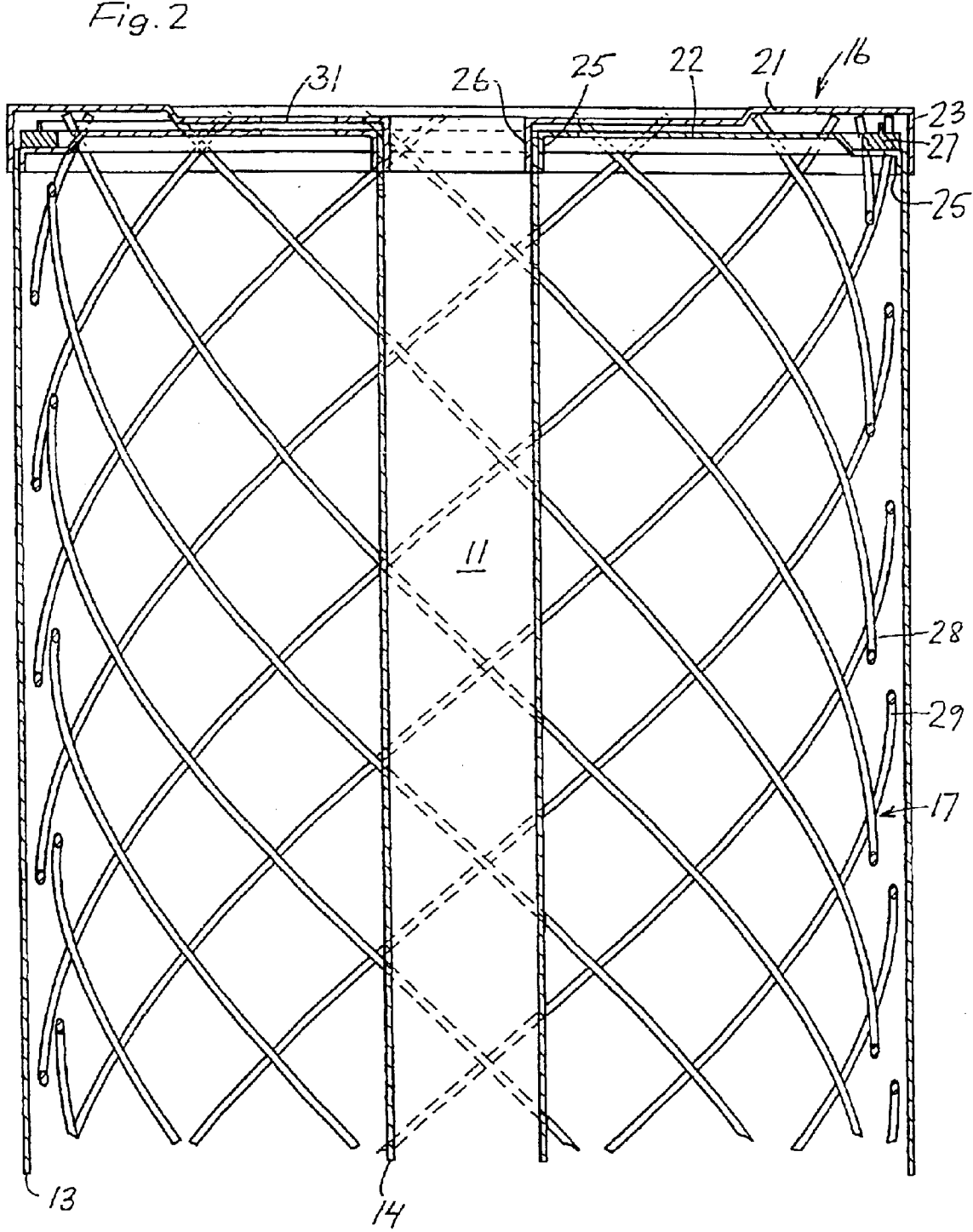
FIG. 2 is a view in diametral section of an end cover of the storage device, part of a reinforcement anchored in the end cover, and parts of elements serving as permanent formwork for the concrete body.

FIG. 2 shows the steel reinforcement 17 in greater detail. A characteristic feature of the reinforcement 17 is the disposition of each of the reinforcing members 28, 29 of the two groups along a spiral line, namely a cylindrical helical line, between the end covers 15 and 16. In one of the two groups the reinforcing members 28 are disposed along an imaginary cylindrical surface slightly closer to the shell 13 than the reinforcing members 29 of the other group, which are also disposed on an imaginary cylindrical surface and the hand of which is opposite to the hand of the reinforcing members of the first group. The two imaginary cylindrical surfaces are concentric with the shell 13 and the centre tube 14. Suitably, the helix angle of all reinforcing members is about 45°, and at least at some of their intersections the reinforcing members suitably are interconnected by wire bindings or other suitable interconnecting members (not shown).

For reasons which will become apparent, each reinforcing member 28, 29 suitably is enclosed in a tubular sheath (not shown in the drawings).

The storage device 40 shown in FIG. 3, which is hereinafter also designated as a cask, is primarily intended for interim or other relatively short-term storage of nuclear fuel, especially during shipping or transfer of nuclear fuel units, e.g. when moving nuclear fuel units from storage pools to a long-term storage site.

The cask 40 differs from the cask 10 of FIGS. 1, 2 in that it only has a single fuel receiver or storage vessel 41, which is centrally positioned and not intended to be completely surrounded by the concrete. Instead, the storage vessel 41 is sealed by means of a separate non-permanent or reopenable closure device 41, which is only diagrammatically shown in FIG. 3 because it may be of any suitable conventional design. FIG. 3 also shows a fuel unit B held in a centered position in the storage space defined by the storage vessel 41, resting on a pedestal 43 therein.

Another difference is that the cask 40 has no separate cooling arrangement. Because the storage is of a short-term nature, the heat produced by the fuel unit can be absorbed by the concrete body without undue heating of the cask. However, if the cask should require separate cooling means, it may be provided with a number of through axial passages which are disposed in a ring about the storage vessel 41 and extend axially through the cask. Air or water can flow upwardly through the passages by natural convection to carry away heat conducted outwardly from the storage vessel 41.

An additional difference is that the outer side of the concrete body 44 is provided with a metal jacket 45 which extends over and past, upwardly and downwardly, the section of the storage vessel 41 that accommodates the nuclear fuel unit B. This jacket, which is suitably made of steel, has a considerable wall thickness, e.g. 10 cm. It adds to the radiation protection afforded by the section of the concrete body 44 it encloses. The diameter of the concrete body 44 can therefore be substantially smaller than in the case where the concrete body alone provides the radiation protection.

The reinforcement 46 is essentially identical with the reinforcement 17 in FIG. 1. However, the end covers 47 and 48 are slightly different from those shown in FIG. 1. In this case the rail 27 is positioned on the outer side of the outer plate 47A, 48A in an annular groove the bottom wall of which engages the outer side of the inner end cover plate 47B, 48B.

Suitably, the design of the end covers shown in FIG. 3 can also be used for the storage container shown in FIG. 1. It is advantageous in that the reinforcing members 46A, 46B are more easily accessible for tensioning and anchoring tha in the design shown in FIG. 1.

Figure 4:
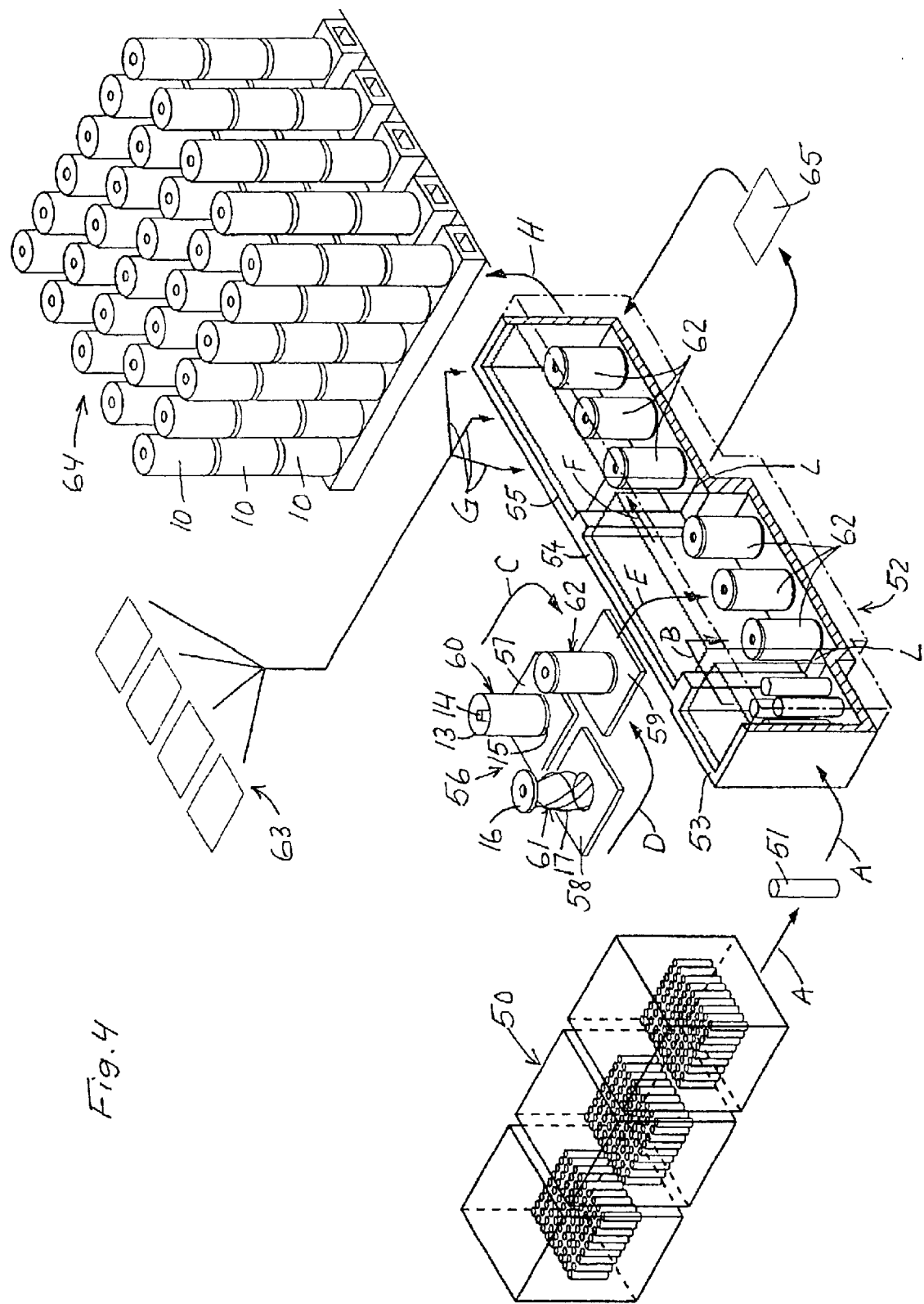
FIG. 4 is a diagrammatic perspective view of a system for manufacturing storage containers in accordance with the method of the invention and for the disposition of manufactured storage containers at a storage site.

The installation or system shown in FIG. 4 for the manufacture of the sealed storage containers 10 with the nuclear fuel contained therein may suitably be located near the site where the storage containers are to be kept during storage, regardless of whether that site is an ultimate storage site or an interim storage site. For example, the storage site may be near a nuclear power plant or at some other place where spent nuclear fuel is stored. In the present case, the nuclear fuel is presumed to be temporarily kept under water in a pool which is dedicated to such short-term storage and from which it is transferred to the system according to the invention. In FIG. 4 this pool is designated by 50 and comprises three individual pool sections.

From the pool 50 the nuclear fuel is transferred in shipping or interim storage containers 51 of the kind shown in FIG. 3, for example, to a different pool or pool system 52 having three pool sections 53, 54, 55 which can be selectively placed in communication with one another, suitably through water locks (only diagrammatically indicated at L in FIG. 4). In FIG. 4, the transfer of the containers 51 is symbolised by arrows A which also symbolises the facilities required for the transfer, such as hoisting or conveying machinery and any other necessary load-handling and control equipment etc.

Pool section 53, which is dedicated to receiving the interim storage containers 51 coming from the pool 50, is filled with water to a depth which is at least equal to and preferably at least 2–3 m greater than the sum of the height of the transport storage containers 51 and the height of the fuel units held in the containers 51. Thus, when the containers 51 rest on the bottom of the pool section 53, the fuel units B can be lifted from the containers 51 and then shifted horizontally without penetrating the water surface. Preferably, the fuel units should newer come closer to the water surface than 2–3 m.

Alternatively, the fuel units can be taken out of the interim storage containers by the side of the pool section and put down into racks or other suitable holders in the pool.

In the adjacent pool section 54 the fuel units removed from the transport containers 51 are introduced into the storage vessels 18 mounted in the formwork which has been prepared for the manufacture of the casks 10 and immersed in the body of water held in the pool section 54. The fuel units are taken from the pool section 53 and moved under water to the pool section 54 where they are put down into the storage vessels 18 in the formwork; throughout this operation the fuel units are completely immersed in the water. To this end, the depth of the body of water in the pool section 54 is at least equal to the height of the formwork and the height of the fuel units, and preferably several metres greater.

In FIG. 4, the transfer of the fuel units kept in the containers 51 into the storage vessels 18 is symbolised by an arrow B which also symbolises the facilities required for the transfer, such as hoisting or conveying machinery and any other necessary load-handling and control equipment etc.

The formwork is assembled in an assembly station 56 by the side of the pool 52 and then lifted and moved to the pool section 54 and placed on the pool bottom. Assembly can be carried out using pre-assembled units which are transported to the assembly station where the formwork is assembled from these units. This is diagrammatically shown in FIG. 4 where the assembly station 56 comprises three sections designated by 57, 58 and 59.

In the first section 57 the lower end cover 15 is assembled and the shell 13 and the centre tube 14 are mounted on the lower end cover. The unit 60 so formed is then moved to the section 59 where the group of storage vessels 18 forming the fuel receiver is added to the unit and secured in position therein by means of suitable supporting and anchoring means. This step, which can also be carried out in the section 57, is symbolised by an arrow C which also symbolises the facilities required for carrying out the step, such as hoisting or conveying machinery and any other necessary load-handling and control equipment etc.

In section 58 of the assembly station 56 the upper end cover 16 and the reinforcement 17 are joined to form a unit 61 which is then lifted and moved to the section 59 and combined with the unit 60 to form the completed formwork 62. This step is symbolised by an arrow D which also symbolises the facilities required for carrying out the step, such as hoisting or conveying machinery and any other necessary load-handling and control equipment etc.

The unit formed by the formwork 62 is then lifted and moved to the pool section 54 and put down on the bottom of that pool section and filled with water. Prior to that, the storage vessels 18 have been filled with the coolant, such as pure water. This step is symbolised by an arrow E which also symbolises the facilities required for carrying out the step, such as hoisting or conveying machinery and any other necessary load-handling and control equipment etc.

Now the fuel units are transferred from pool section 53 into the storage vessels 18 in the formwork 62 (arrow B). Naturally, the fuel units then displace some of the pure water in the vessels 18. Because of the pre-filling of the storage vessels with the pure water coolant, contamination of the coolant is avoided. The depth of the water in pool section 54 of course should be great enough to ensure that the fuel units need not come closer to the water surface than 2 to 3 m.

Then the storage vessels 18 are sealed, whereupon the formwork 62 is transferred to the pool section 55. The depth of the water body therein in great enough to ensure that the formwork will be completely immersed. Preferably, the depth of the water is such that the top of the formwork is at least 2 to 3 m below the water surface. The transfer of the formwork to the pool section is symbolised by an arrow F which also symbolises the facilities required for carrying out the transfer step, such as hoisting or conveying machinery and any other necessary load-handling and control equipment etc.

In the pool section 55 the formwork 62 is filled with concrete taken from a nearby concrete station 63. Preferably, the placement of the concrete in the formwork is carried out by means of one or more so-called tremie tubes, that is, placing tubes used for underwater placement of concrete, which are passed through the openings 34, 35 in the upper end cover 16 down to near the lower end cover 15. As the upper surface of the concrete being fed into the formwork raises, the placing tube or tubes is/are raised such that the lower tube end is constantly slightly below that surface. The concrete may be vibrated during the placement.

The concrete placement step described in the preceding paragraph is symbolised by an arrow G which also symbolises the facilities required for carrying out the this step, such as hoisting or conveying machinery and any other necessary load-handling and control equipment, the tremie or placing tubes, etc.

When the concrete has set and hardened to some extent, but not reached its ultimate strength, such as after one or two days, the reinforcement 17 is tensioned to some degree, working from the upper end cover 16. The completed cask 10 can then be taken out of the pool section 55. After some additional time, the reinforcement 17 is further tensioned in one or more steps, until it has reached its final pre-tension. This aftertensioning is suitably carried out from both end covers 15, 16. Containment of the reinforcing members in tubular sheaths, which may be filled with a lubricant, ensures transmission of the tensioning force all the way between the end covers. When the tensioning is completed, concrete may be injected into the sheaths and the cavities at the rails 27 in the end covers.

After any required monitoring and signalling equipment has been added to the cask 10, the completed cask is transported to a storage site, designated by 64 in FIG. 4. At this site the casks 10 may be stacked, e.g. with three casks in each stack, leaving an open space between the stacks so that air, or water if the storage site is in water, can flow freely between the stacks. The stacks are suitably placed on a support which allows air or water to flow into and upwardly through the shafts formed by the aligned central passages 11 in the casks 10. If desired or required, this shaft may be extended upwardly by means of an extension tube for enhancing the chimney draught or thermosiphon flow that the shaft produces as a result of the heating of the air or water caused by the heat generated by the nuclear fuel in the casks 10 and conducted to the shaft.

The removal of the formwork 62 with the concrete body formed therein, the operations carried out on the completed cask 10 after the removal, including the transfer to the storage site 62 as described in the two preceding paragraphs is symbolised by an arrow H. This arrow also symbolises the facilities required for carrying out the this step, such as hoisting or conveying machinery and any other necessary load-handling and control equipment, etc.

Adjacent to the pool section 55 a purifying system 65 is provided, through which the water in that pool section is circulated to be purified.

Figure 5:
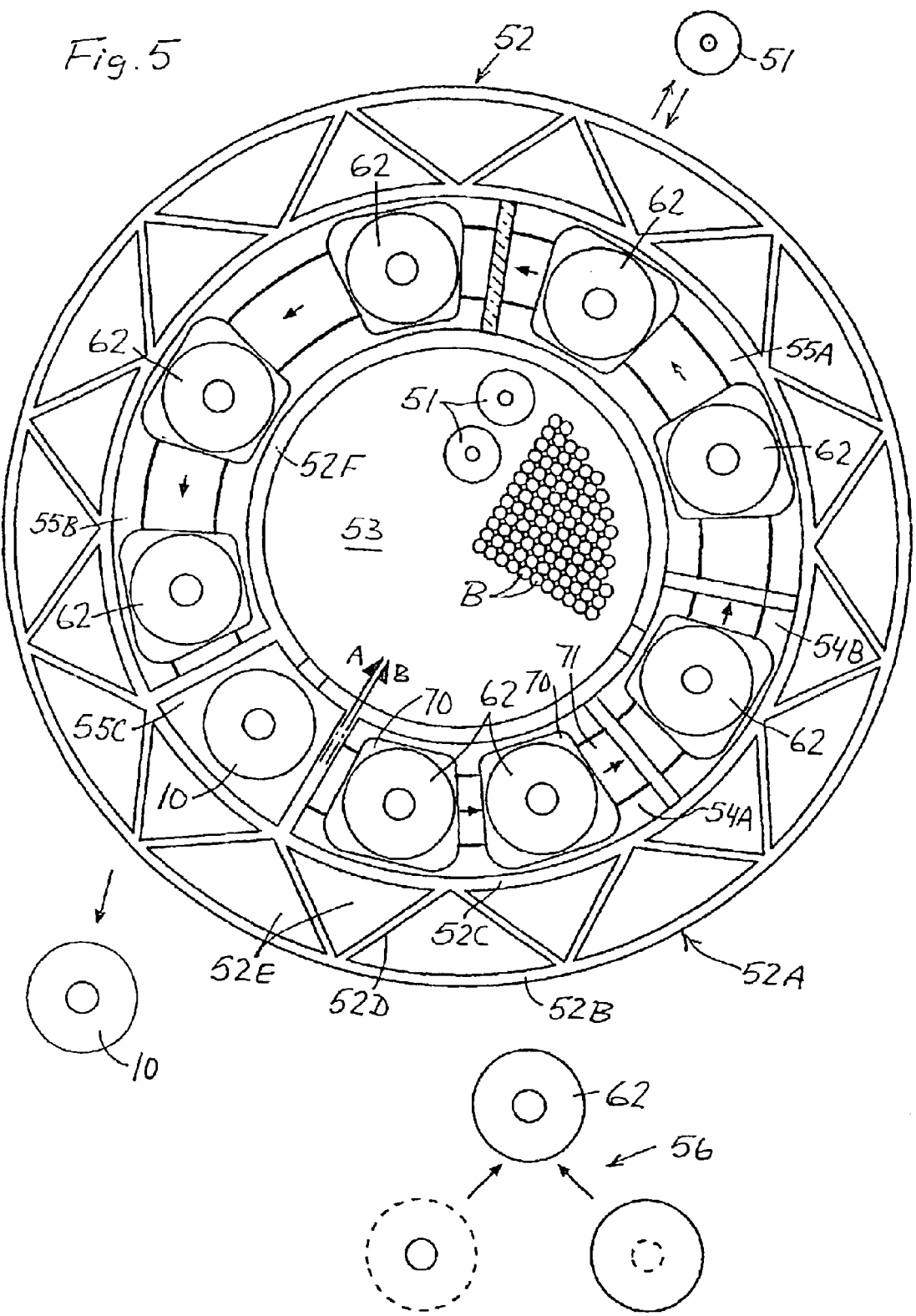
FIG. 5 is a diagrammatic plan view of another embodiment of the system for manufacturing storage containers in accordance with the method of the invention.
Figure 6:
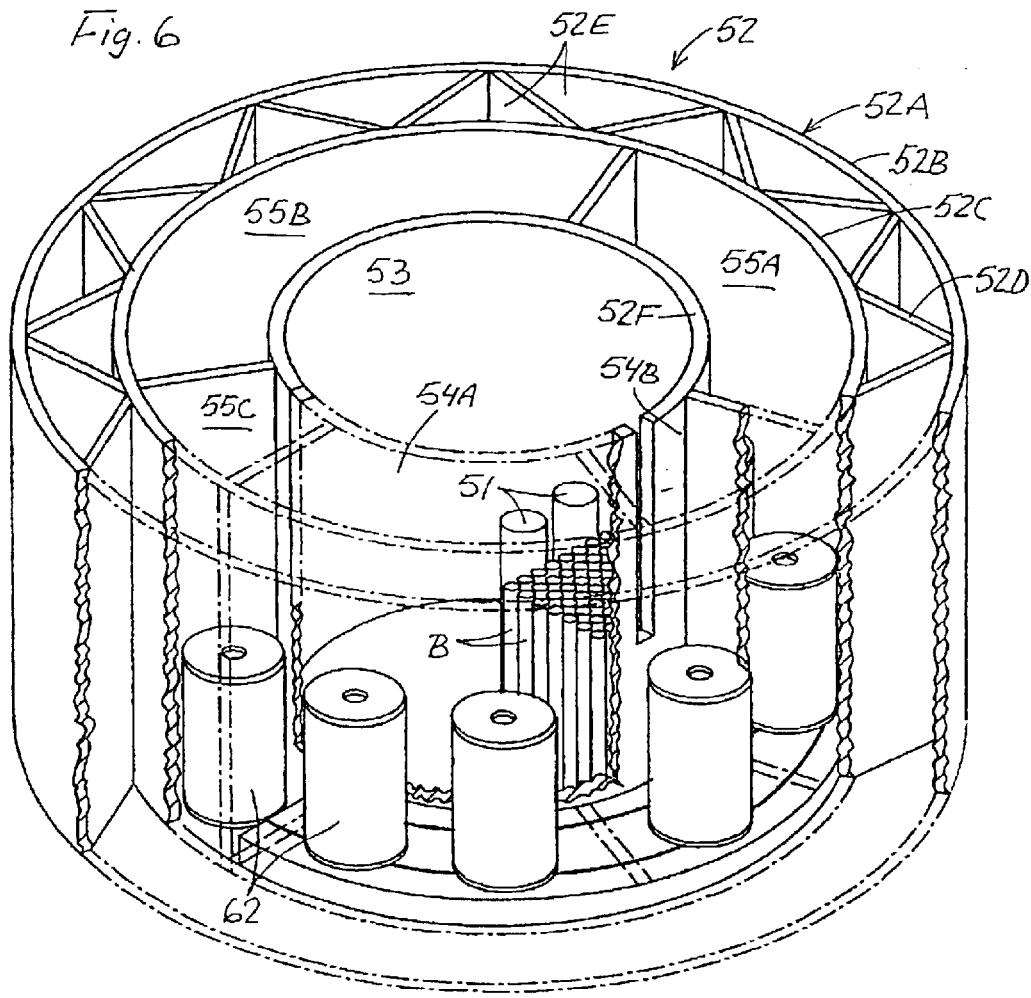
FIG. 6 is a perspective view of the system shown in FIG. 5, parts being broken away to make interior parts visible.
Figure 7:
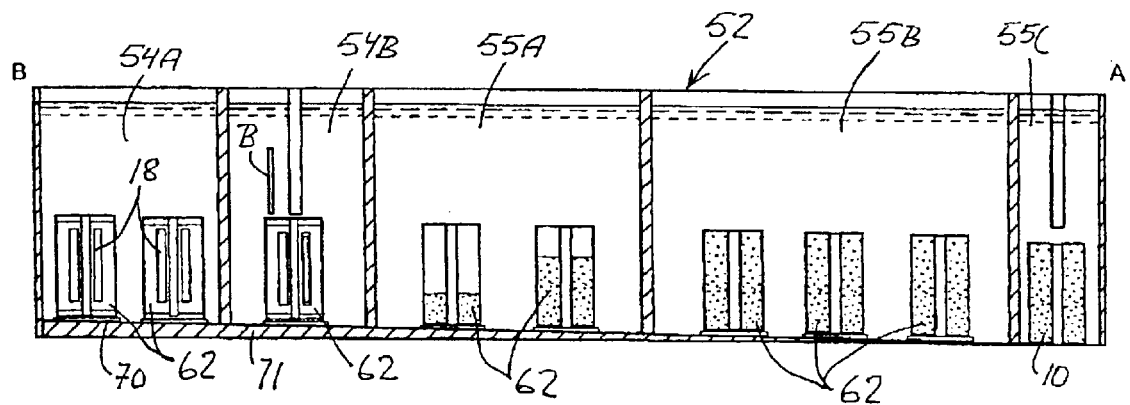
FIG. 7 is a developed sectional view from line A-B in FIG. 5.

The manufacturing system or plant shown in FIGS. 5 to 7 largely embodies the principles of the system shown in FIG. 4 but is somewhat different in respect of the construction of the pool 52, that is, the part of the system in which the fuel units are introduced into the storage vessels mounted in the formwork and concrete is placed in the formwork. Parts in FIGS. 5–7 for which there are corresponding parts in FIG. 4 have the same reference numerals as the parts in FIG. 4.

The pool 52 in FIGS. 5–7 differs from the pool in FIG. 4 mainly by being in the shape of a circular, silo-like construction, in which the formwork 62 is moved along an arcuate path.

The outermost part of the pool 52 is formed by an outer wall 52A, which is a truss-like circular cylindrical shell construction with an outer shell 52B, an inner shell 52C and a number of walls 52C interconnecting the outer and inner shells. The open spaces between the outer and inner shells may be used as storage rooms for equipment and materials used in the production of casks.

Inside the outer wall 52A and concentric with it there is a circular cylindrical inner wall 52F. The space between the outer wall 52A and the inner wall 52F, and also the space inside the inner wall are filled with water. The last-mentioned space forms the pool section 53 where the shipping storage containers 51 and the fuel units B are placed before the fuel units are transferred to the storage vessels 18 in the formwork 62.

In the annular space between the outer wall 52A and the inner wall 52F additional pool sections 54A, 54B, 55A, 55B and 55C are provided. Of these pool sections, pool section 54 may be regarded as corresponding to a part of the pool section 54 of FIG. 4, while the pool sections 55A and 55B may be regarded as corresponding respectively to the rest of the pool section 54 and the pool section 55 of FIG. 4. Pool sections 54A and 55C have no direct counterparts in FIG. 4.

From the assembly station 56 the assembled formwork 62 with the storage vessels 18 mounted therein are transferred, e.g. lifted over to pool section 53 in which they are placed on a carriage 70 that is movable on a track 71. This track runs along a circular line or path through all pool sections except pool section 55C and may be slightly inclined in the direction of movement of the carriages 70 to facilitate the movement. On the track, which of course may be constructed in any other suitable way, the formwork 62 may be moved from pool section 554 to the following pool sections 54A, 55A, 55B and 55C. In order that this movement may take place without intermixing the water contained in the various sections too much, the delimitations between pool sections 54A/54B, 54B/55A and 55A/55C are formed by water locks represented by the radial walls shown in the figures.

Alternatively, the formwork 62 may be moved within and between the pool section by means of hoisting machinery.

Pool 55C is used in a manner described below to hold casks 10 to be opened for removal of the stored nuclear fuel.

The manufacture of the casks 10 and the containment of the nuclear fuel in them are carried out in substantially the same way as in the system shown in FIG. 4.

The formwork 62 assembled in the assembly station 56 and the storage vessels mounted in the formwork to serve as a fuel receiver are lifted over to pool section 54A using suitable hoisting machinery. In the illustrated embodiment, pool section 54A can hold formwork 62 for two casks at a time, but it may also be dimensioned and designed to hold formwork for either a single cask or more than two casks.

When the formwork 62 for a cask 10 is to be charged with fuel units B from pool section 53, that formwork in the pool section 54A which is closest to the next pool section 54B is moved over to that pool section through the intervening water lock. The fuel units B are moved from the central pool section 53 to the storage vessels 18 in the formwork 62 moved over to pool section 62, and the storage vessels 18 are then sealed in the manner described above.

The thus charged formwork 62 is then moved from pool section 54B to pool section 55A through the intervening water lock. In pool section 55A the casting of the concrete body of the cask is carried out in the manner described with reference to FIG. 4. Pool section 55A can hold formwork 62 for two casks at a time, but it may also be made to hold formwork for a single cask or formwork for more than two casks. If it is made to hold formwork for two or more casks, is may also serve as a buffer space, so that formwork for a cask that has already been cast can be left in pool section 55A until space is free in pool section 55B without the placement of concrete in the formwork for the next cask is obstructed. After placement of the concrete, which is supplied from a concrete station corresponding to that shown in FIG. 4, the formwork 62 with the placed concrete therein is moved to pool section 55B where the concrete is allowed to set and harden and supplemental work on the now more or less completed cask 10 may be carried out, such as initial tensioning and/or aftertensioning of the reinforcement members.

When the concrete in the cask 10 has hardened sufficiently, the cask is lifted from pool section 55B to be moved to a storage site corresponding to the storage site 64 shown in FIG. 4, if required after additional supplemental work on the casks has been carried out by the side of the pool 52.

Pool section 55C is used if for some reason a cask 10 containing nuclear fuel needs to be reopened for removal or inspection of the nuclear fuel. This may be necessary if the fuel is to be reprocessed or otherwise has to be removed from the cask.

In such case the cask 10 is immersed in pool section 55C and opened. If the cask is made in accordance with FIGS. 1 to 3, the opening is carried out by working off the concrete above the storage vessels, so that the stored fuel units can be lifted and transferred to the central pool section 53 and placed in shipping casks 51 without having in any phase of the process to be raised to the water surface in the pool section or even come close to it.

In a modification of the method according to the invention the formwork 62 is not provided with storage vessels corresponding to the storage vessels 18 shown in FIG. 1 before the formwork is placed in pool section 54. Instead, storage vessels in the form of special fuel containers are used, in which the nuclear fuel is loaded while the fuel containers are in a separate pool or pool section or in pool section 53.

In this modification, the part which corresponds to the formwork 62 is prepared so that it can receive the fuel containers after it has been placed in the pool section 54. For example, that part of the formwork which corresponds to the formwork unit 60 may be provided with suitable guides and supports enabling positioning of the fuel containers correctly in the formwork prior to the placement of the concrete. That part of the formwork which corresponds to the formwork unit 60 may first be placed in pool section 54, in which the fuel containers are the positioned in that part, whereupon the part corresponding to the formwork unit 61 is mounted.

It is to be understood that the illustrated and described systems and facilities for the production of casks are only examples of the implementation of the invention and that the practical details may be varied widely within the scope of the invention. For ease of illustration and explanation of the invention, the hoisting and other material handling facilities needed for the manipulation and transfer of components and materials are omitted or illustrated only symbolically, e.g. by arrows. The construction of such facilities and their mode of operation form no part of this invention and may be entirely conventional.

What is claimed is:

1. A method for storing nuclear fuel in a storage container including a concrete body and a fuel receiver embedded in the concrete body, comprising the steps of introducing the nuclear fuel into the fuel receiver, providing formwork for the concrete body and mounting the fuel receiver within the formwork, placing the formwork in an immersed position in a pool containing a body of water, placing concrete in the immersed formwork to form the concrete body after said mounting of the fuel receiver within the framework step and after said introducing of the nuclear fuel in the fuel receiver step, and removing the formwork with the concrete body formed therein from the pool.

2. A method according to claim 1 in which the nuclear fuel is introduced into the fuel receiver after the formwork has been placed in the immersed position in the pool.

3. A method according to claim 2, in which the fuel is transferred to the fuel receiver from an underwater position in an adjacent pool or pool section.

4. A method according to claim 2 in which subsequent to introduction of the nuclear fuel into the fuel receiver and sealing of the fuel receiver the formwork is transferred while in an immersed position to an adjacent pool or pool section in which placement of the concrete in the formwork is effected.

5. A method according to claim 3, in which the nuclear fuel is placed in the adjacent pool or pool section while accommodated in a shipping container and in which the shipping container is placed in an immersed position in that pool or pool section.

6. A method according to claim 1 in which the fuel is introduced into the fuel receiver before the fuel receiver is introduced into the formwork and in which the fuel receiver with the fuel introduced into it is placed in the formwork after the formwork has been placed in the immersed position in the pool.

7. A method according to claim 6 in which the fuel receiver with the fuel introduced into it is transferred while in an immersed position from a pool or pool section containing a body of water to the immersed formwork.

8. A method according to claim 1 in which the fuel receiver is jointlessly embedded in the concrete.

9. A method according to claim 1 in which the concrete body is cast in the shape of a substantially straight upstanding cylinder.

10. A method according to claim 9 in which the concrete body is formed with a central, axially through passage and the fuel receiver is provided in the concrete body as a number of individually sealable receiver sections distributed about the central passage and in which the nuclear fuel is distributed to the receiver sections during its introduction into the fuel receiver.

11. A method according to claim 1 in which the formwork is assembled as permanent formwork from at least the following components: a lower end cover, an upper end cover and a cylindrical outer wall which is joined with the end covers, and in which a reinforcement is mounted in the form work and anchored in the end covers.

12. A method according to claim 11 in which the reinforcement is provided as two groups of reinforcing members which extend helically along two imaginary cylindrical surfaces inwardly of and close to the inner side of the outer formwork wall, the reinforcing members of each group being uniformly spaced apart circumferentially and are of the same hand, whereas the hand of the reinforcing members of the other group is opposite to the hand of the reinforcement members of the first group.

13. A method according to claim 1 in which the concrete is placed in the formwork through at least one vertical placing tube the mouth of which is positioned adjacent the lowest part of the formwork cavity when the placing commences and raised as the placing proceeds, such that it is constantly slightly below the surface of the placed concrete.

14. A method as claimed in claim 12 in which the reinforcing members are stressed at least to some degree after the concrete has hardened partially but not completely.

15. A method according to claim 1 in which the formwork is assembled and provided with the fuel receiver outside the pool in which the nuclear fuel is introduced into the fuel receiver.

* * * * *